United States Patent [19]
Kita

[11] Patent Number: 4,572,005
[45] Date of Patent: Feb. 25, 1986

[54] MAGNETOSTRICTION TORQUE SENSOR

[75] Inventor: Toru Kita, Yokosuka, Japan

[73] Assignee: Nissan Motor Company, Limited, Yokohama, Japan

[21] Appl. No.: 658,213

[22] Filed: Oct. 5, 1984

[30] Foreign Application Priority Data

Oct. 19, 1983 [JP] Japan ................ 58-195897

[51] Int. Cl.$^4$ ............................................. G01L 3/10
[52] U.S. Cl. .................................. 73/862.36; 324/209
[58] Field of Search ............. 73/DIG. 2, DIG. 3, 779, 73/855, 862.36, 862.69; 324/209

[56] References Cited

U.S. PATENT DOCUMENTS

| | | | |
|---|---|---|---|
| 2,637,205 | 5/1953 | Miller | 73/862.36 |
| 4,364,278 | 12/1982 | Horter et al. | 73/862.36 |
| 4,414,856 | 11/1983 | Winterhoff | 73/862.36 |

FOREIGN PATENT DOCUMENTS 1115051 10/1961 Fed. Rep. of Germany ... 73/DIG. 3

OTHER PUBLICATIONS

V. V. Budzinskii, "Measuring Stresses by the Magnetic Anisotropy Method", Meas. Tech. (USA), No. 10, Oct. 1970, pp. 1524-1527.

Primary Examiner—Charles A. Ruehl
Attorney, Agent, or Firm—Schwartz, Jeffery, Schwaab, Mack, Blumenthal & Evans

[57] ABSTRACT

The magnetic head of a magnetostriction torque sensor is covered by a magnetic head holder made of a synthetic resin and supported by an outer tubular member via an elastic supporting member. The magnetic head holder is formed with bearing portions by which an axle to be measured is rotatably supported in such a way that a predetermined clearance is always kept at a constant value between the magnetic head and the axle. Therefore, even if the axle to be measured or the outer tubular member to support the magnetic head deforms or if the concentricity of the outer tubular member with respect to the axle is inferior, it is possible to stably and precisely detect the torque applied to the axle to be measured. The above-mentioned structure of the magnetostriction torque sensor can reduce the manufacturing cost and improve the productivity.

10 Claims, 11 Drawing Figures

MAGNETOSTRICTION TORQUE SENSOR

BACKGROUND OF THE INVENTION

1. Field of the Invention

The present invention relates generally to a magnetostriction torque sensor for detecting a torsional stress applied to an axle to be measured and more particularly to a magnetic head supporting structure of a magnetostriction torque sensor by which magnetostrictive components of a magnetic field caused by the torsional stress can be detected by a sensing coil or by a Hall effect element.

2. Description of the Prior Art

A torque applied to an axle to be measured can be detected by various well-known methods. For instance, a proximity microswitch is disposed near an axle so as to be actuated when torsional angle of an axle exceeds a predetermined value. In some cases, a strain gauge is directly attached to an outer peripheral surface of an axle and a change in resistance caused by strain is measured by a bridge circuit or an oscilloscope. Further, in the case of detecting a torque applied to a steering shaft of an automotive vehicle, an elastic member is attached to the steering shaft in such a way that a switch is activated by a torsional displacement of the steering shaft. However, the above-mentioned torque sensors are of contact type, because a sensor is attached directly to a movable axle.

In contrast with this, a magnetostriction torque sensor is well known as non-contact type, which is disclosed in Japan Published examined patent application No. S31-942. In this torque sensor, a large wide U-shaped exciting core is arranged near the outer peripheral surface of an axle made of a magnetostrictive material in order to generate a magnetic flux on the surface of the axle, and a small narrow U-shaped sensing core is arranged also near the outer peripheral surface and under the large exciting core in such a way as to cross at a right angle to each other in order to detect the magnetostrictive components of magnetic field caused by a torsional deformation of the axle to be measured. In such a magnetostriction torque sensor, it is inevitably necessary to accurately maintain a predetermined clearance between the exciting core end and the axle or between the sensing core end and the axle. This is because if the clearance fluctuates, it is impossible to accurately detect a torsional stress applied to an axle to be measured, since the magnetostrictive components to be sensed as a voltage is extremely low. Additionally, the clearance is as small as on the order of several to several tens of micron ($10^{-6}$ meter). In order to maintain the clearance between the core ends and the axle surface, conventionally an axle to be measured is housed within an outer tubular member being supported by two bearings attached on either end of the outer tubular member. The two cores are fixed to the inner peripheral surface of the outer tubular member in such a way that a predetermined clearance is maintained between the core end surfaces and the outer peripheral surface of the axle to be measured.

In the prior-art magnetostriction torque sensor as described above, however, there exists a serious problems as follows: The basic problem is to require an extremely high precision in manufacturing and assembling the elements of the torque sensor. In more detail, the essential requirements in manufacturing the magnetostriction torque sensor are as follows: (1) the roundness and the straightness of the axle to be measured should be excellent; (2) the roundness and the straightness of the outer tubular member should also be excellent; (3) the concentricity of the axle and the tubular member should be high; (4) the bearings of the outer tubular member to support the axle should be precise in roundness, concentricity, radial dimension, etc.; (5) a rigid magnetostrictive material should be used for the axle to be measured; and (6) highly precise manufacturing and assembling technique or skills are required. Accordingly, the above-mentioned requirements result in a higher manufacturing cost and a lower productivity.

The prior-art magnetostriction torque sensor disclosed in the Japan Patent (S31-942) will be described in more detail hereinafter with reference to the attached drawings under DETAILED DESCRIPTION OF THE PREFERRED EMBODIMENTS.

SUMMARY OF THE INVENTION

With these problems in mind, therefore, it is the primary object of the present invention to provide a magnetostriction torque sensor of non-contact type which is low in manufacturing cost, high in productivity, and stable and precise in detecting a torsional stress applied to an axle to be measured.

To achieve the above-mentioned object, the magnetostriction torque sensor according to the present invention comprises (a) an outer tubular member for housing an axle to be measured in such a way as to rotatably support the axle by a pair of bearings attached thereto on either side thereof; (b) a magnetic head including an exciting core having an exciting coil for generating a magnetic field on an outer peripheral surface of the axle to be measured and a sensing core having a sensing coil or a Hall effect element for sensing magnetostrictive components of the magnetic field caused by a torsional stress applied to the axle; (c) a magnetic head holder for covering and supporting the magnetic head therewithin, the holder being formed with bearing portions through which the axle to be measured is rotatably supported in such a way that a predetermined small clearance is maintained between the magnetic head and the axle; and (d) an elastic supporting member for elastically supporting the magnetic head holder to an aperture formed in the outer tubular member in such a way as to allow the magnetic head holder to be movable in the radial direction of the axle.

In the magnetostriction torque sensor thus constructed, provided that the roundnesses and the straightnesses of the axle to be measured and the bearing portion of the magnetic head holder are accurate within a short distance, it is possible to accurately maintain the clearance between the magnetic head end and the outer surface of the axle, so that it is possible to stably and precisely detect a torsional stress or a torque applied to an axle, while reducing the manufacturing cost and improving the productivity.

BRIEF DESCRIPTION OF THE DRAWINGS

The features and advantages of the magnetostriction torque sensor according to the present invention over the prior-art torque sensor will be more clearly appreciated from the following description of the preferred embodiments of the invention taken in conjunction with the accompanying drawings in which like reference numerals designate the same or similar elements or sections throughout the figures thereof and in which.

DETAILED DESCRIPTION OF THE PREFERRED EMBODIMENTS

To facilitate understanding of the present invention, a reference will be made to a prior-art magnetostriction torque sensor with reference to the attached drawings.

The phenomenon of magnetostriction is well known, in which a distortion will occur when a magnetic material is magnetized or magnetic characteristics or permeability ($\mu$) will change when a magnetized magnetic material is distorted by a mechanical stress. The above-mentioned magnetostriction phenomenon is prominent in nickel, nickel alloy, iron-aluminum alloy, iron-nickel alloy, iron-cobalt alloy, etc.

For instance, in the case of permeability alloy (Permalloy) (nickel-iron alloy including nickel of 45 to 80 percent), the permeability increases prominently when tension is applied thereto. On the other hand, in the case of nickel or some nickel alloys, the permeability increases when compression is applied thereto. The above-mentioned change in permeability is utilized for measuring mechanical tensional, compressional or torsional stress.

Figure 1:
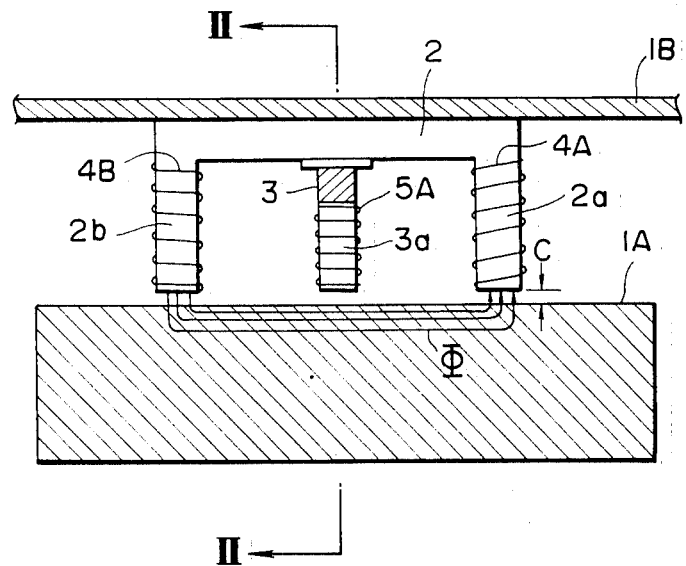
FIG. 1 is a fragmentary cross-sectional view showing an exciting core including two exciting coils and a sensing core including two sensing coils used for a prior-art magnetostriction torque sensor, taken along the axial direction of an axle to be measured, in which the two cores are directly fixed to an inner surface of an outer tubular member in such a way that a predetermined clearance is maintained between the core ends and the outer surface of the axle.
Figure 2:
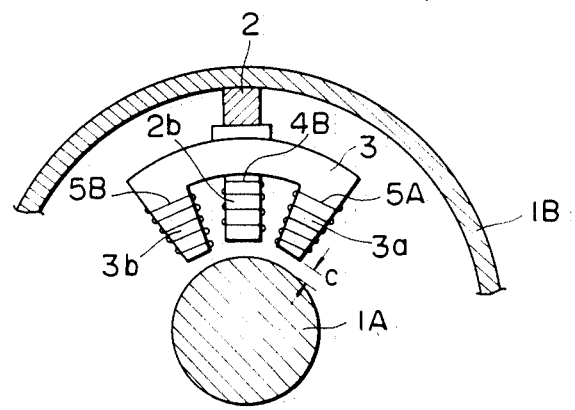
FIG. 2 is a fragmentary cross-sectional view similar to FIG. 1, taken along the line II—II shown in FIG. 1 or along the radial direction of the axle.

An example of prior-art magnetostriction torque sensors of this type is disclosed in Japan Published examined patent application No. S31-942. With reference to FIGS. 1 to 4, this prior-art torque sensor will be described hereinbelow. The torque sensor is roughly made up of a pair of right-angled soft iron cores and a measuring circuit. Near the outer periphery of an axle 1A to be measured, a large wide U-shaped exciting core 2 is arranged in the axial direction of the axle 1A and a small narrow U-shaped sensing core 3 is arranged in the radial direction of the axle 1A. The two cores 2 and 3 are arranged so as to cross at a right angle to one another with the small narrow U-shaped core 3 positioned under the wide U-shaped core 2 as shown. Two exciting coils 4A and 4B are wound around two legs 2a and 2b of the large exciting core 2 in such a way that two exciting coils 4A and 4B can additively generate a magnetic field $\Phi$ on the outer surface of the axle 1A in the axial direction thereof. Two sensing coils 5A and 5B are wound around two legs 3a and 3b of the small sensing core 3 in such a way that two sensing coils 5A and 5B can also additively sense the change in the magnetic force of the magnetic field generated by the two exciting coils 4A and 4B when a torsional stress is applied to the axle 1A. The axle 1A to be measured is housed within an outer tubular member 1B being supported by two bearings attached on either end of the outer tubular member. The two cores 2 and 3 are directly fixed to the inner peripheral surface of the outer tubular member 1B in such a way that a predetermined clearance C is maintained between the core end surfaces and the outer peripheral surface of the axle 1A, as depicted in FIGS. 1 and 2.

Figure 3:
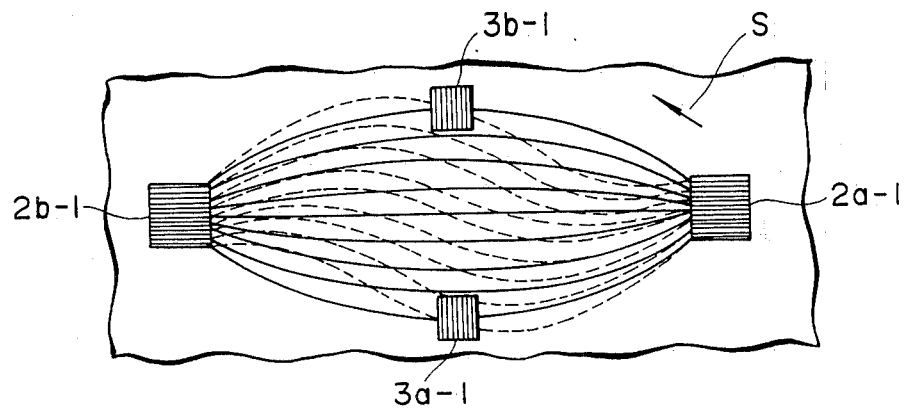
FIG. 3 is a diagrammatical view showing the distribution of lines of magnetic force within a magnetic field generated by the exciting coils of the prior-art magnetostriction torque sensor shown in FIGS. 1 and 2, in which solid lines represent the case where no torsional stress is applied to the axle to be measured and dashed lines represent the case where a torsional stress is applied to the axle in the direction of arrow S.

FIG. 3 illustratively shows the distribution of lines of magnetic force of the magnetic field generated by the exciting core 2 of the above-mentioned magnetostriction torque sensor. In the drawing, the reference numeral 2a-1 denotes the lower end surface of the leg 2a of the large exciting core 2; the reference numeral 2b-1 denotes the lower end surface of the leg 2b of the large exciting core 2. Similarly, the numeral 3a-1 denotes the lower end surface of the leg 3a of the small sensing core 3; the numeral 3b-1 denotes the lower end surface of the leg 3b of the small sensing core 3. The solid lines represent the distribution of magnetic force lines obtained when no mechanical stress is applied to the axle 1A to be measured. The dashed lines represent the distribution of magnetic force lines obtained when a mechanical stress is applied to the axle 1 to be measured in the direction of the arrow S, for instance. FIG. 3 indicates that when a torsional stress S is applied to the axle 1A to be measured, the directions of magnetic force lines are distorted. Additionally, since a torsional stress can be divided into tensile stress and compressive stress, the permeability $\mu$ of the axle 1 also changes. Therefore, it is possible to detect a change in magnitude of a torsional stress or a torque applied to the axle 1 as a change in voltage induced across the sensing coils 5A and 5B.

Figure 4:
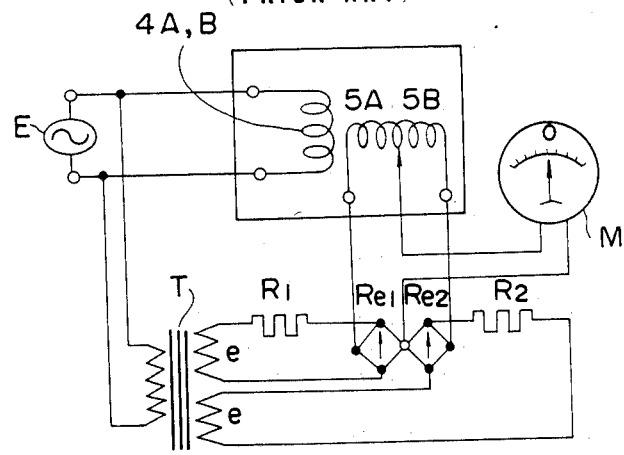
FIG. 4 is a schematic circuit diagram of a typical example of a measuring circuit of the magnetostriction torque sensor.

FIG. 4 shows an example of the measuring circuits used with the magnetostriction torque sensor shown in FIGS. 1 and 2. In the drawing, the two exciting coils 4A and 4B are shown as a single coil and two sensing coils 5A and 5B are also shown as a single coil having a center tap. An alternating power supply E is directly applied to the exciting coils 4A and 4B. Further, the same alternating power supply E is indirectly applied to the sensing coils 5A and 5B through a transformer T and a pair of diode bridge-connected rectifiers $Re_1$ and $Re_2$ as shown. In more detail, a voltage e developed across a first secondary coil of the transformer T is applied to two terminals of a first rectifier $Re_1$ through a resistor $R_1$; a voltage e developed across a second secondary coil of the transformer T is applied to two terminals of a second rectifier $Re_2$ through a resistor $R_2$. Further, the sensing coil 5A is connected across the other two terminals of the first rectifier $Re_1$ with the center tap of the single sensing coil 5A and 5B connected thereto through an ammeter M; the sensing coil 5B is connected across the other two terminals of the second rectifier $Re_2$ with the center tap of the single sensing coil 5A and 5B connected thereto through the same ammeter M. Since the voltages applied to the two sensing coils 5A and 5B are balanced with each other when no torsional stress is applied to the axle, no current flows through the ammeter M. However, when a torsional stress is applied to the axle, since the distribution of magnetic force lines changes and additionally the permeability $\mu$ changes, the voltages developed across the two sensing coils 5A and 5B are unbalanced to each other, so that a sensing current flows through the ammeter M. Further, in the measuring circuit shown in FIG. 4, there are advantages such that it is possible to indicate the direction of a torque applied to the axle to be measured and to cancel various harmful influences such as higher harmonics, noise signals, supply voltage fluctuations, etc. which are developed across the two sensing coils 5A and 5B, respectively, in the same way.

In the prior-art magnetostriction torque sensor thus constructed, however, there exists a severe condition such that the clearance C between all the lower end surfaces 2a-1, 2b-1, 3a-1 and 3b-1 of the legs of the two cores 2 and 3 and the outer peripheral surface of the axle 1A should always be kept at a predetermined value as small as on the order of several to several tens of micron ($10^{-6}$ meter). In other words, in the prior-art magnetostriction torque sensor, it is possible to accurately detect a torque appled to an axle only when the clearance is kept accurately. Therefore, it is inevitably necessary to manufacture and assemble the various mechanical elements of the torque sensor under extremely high precise conditions. In more detail, the roundnesses and the straightnesses of the axle 1A and the outer tubular member 1B should be highly excellent; the concentricity of both the axle 1A and the tubular member 1B should be high; the bearings to support the axle 1A should be precise in roundness, concentricity, radial dimension, etc.; a rigid material should be used for the mechanical elements; etc. The above-mentioned requirements result in a higher manufacturing cost and a lower productivity.

In particular, in the case where the magnetostriction torque sensor is attached to a steering shaft for an automotive vehicle in order to detect torque applied to the steering shaft for controlling a power steering system, both the steering shaft and the steering column should be manufactured and assembled precisely in roundness, straightness, concentricity; highly precise bearings should be used for supporting the steering shaft; the steering shaft and the steering column should be made of an expensive material having good rigidity; various high technique or skills are required in assembling these mechanical elements, thus similarly causing a higher manufacturing cost while reducing the productivity.

In view of the above description, reference is now made to the magnetostriction torque sensor according to the present invention. In this specification, the present invention will be explained with respect to its application to a magnetostriction torque sensor attached to a steering shaft for an automotive vehicle in order to detect a torque applied to the steering shaft. The detected torque of the steering shaft serves to control a power steering system provided for an automotive vehicle.

Figure 5:
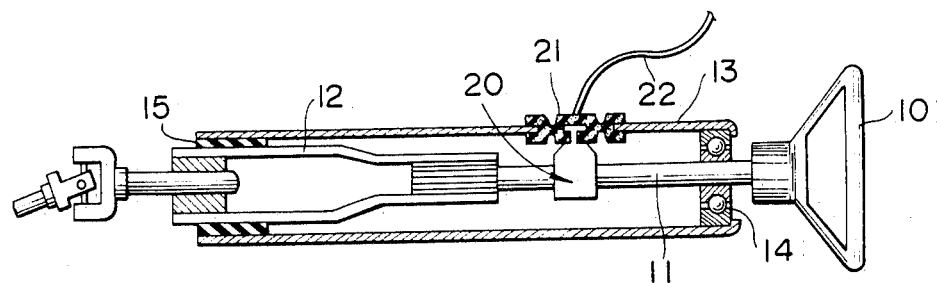
FIG. 5 is a diagrammatic cross-sectional view showing a steering system for an automotive vehicle provided with the torque sensor according to the present invention, taken along the axial direction of a steering shaft, in which a magnetic head of the torque sensor according to the present invention is elastically supported by a steering column.

FIG. 5 diagrammatically shows a steering apparatus for an automotive vehicle. In the drawing, a steering wheel 10 is connected to one end of a steering shaft 11 and a steering tube 12 is connected to the other end of the steering shaft 11. The steering shaft 11 is supported by a ball bearing 14 disposed at one end portion of the steering column 13. The steering tube 12 is supported by a bearing 15 disposed at the other end portion of the steering column 13.

A magnetic head 20 of the magnetorestriction torque sensor according to the present invention is attached to the steering shaft 11 in position within the steering column 13. Within this magnetic head 20, there are housed a pair of a ferrite exciting core having two exciting coils and a ferrite sensing core having two sensing coils in the same manner as explained with reference to FIGS. 1 and 2, but not shown. A high frequency current is passed through the exciting coils (not shown) and a change in magnetic force distributing on the outer peripheral surface of the steering shaft 11 is sensed through the sensing coils (not shown). The magnetic head 20 is supported by the steering column 13 via an elastic supporting member 21 fitted to an aperture formed in the steering column 13. Further, the reference numeral 22 denotes a cable including leads extending from the exciting and sensing coils.

Figure 6:
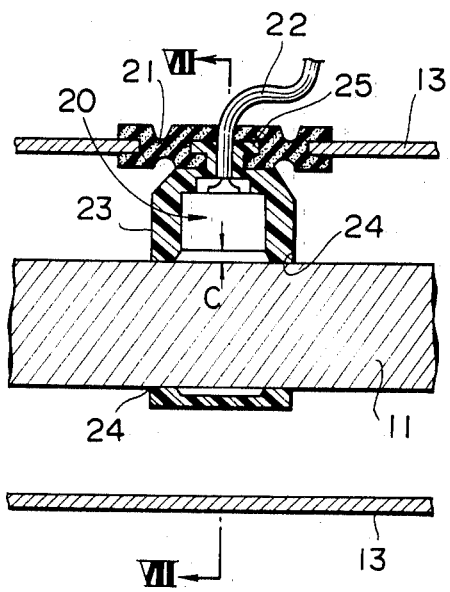
FIG. 6 is an enlarged fragmentary cross-sectional view showing a first embodiment of the magnetic head supporting structure of the magnetostriction torque sensor according to the present invention, taken along the axial direction of the steering shaft, in which the steering shaft is rotatably supported by a magnetic head holder in such a way that a predetermined clearance is maintained between the magnetic head end and the outer surface of the steering shaft.
Figure 7:
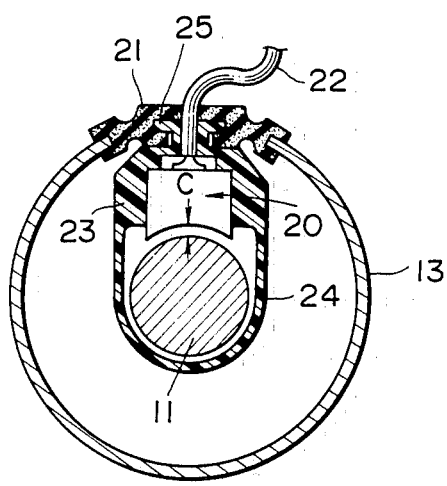
FIG. 7 is a fragmentary cross-sectional view similar to FIG. 6, taken along the line VII—VII shown in FIG. 6 or along the radial direction of the steering shaft.

FIGS. 6 and 7 shows a first embodiment of the magnetostriction torque sensor according to the present invention in an enlarged scale. As depicted by these drawings, the magnetic head 20 is covered by a magnetic head holder 23. The magnetic head holder 23 is formed with a bearing portion 24 by which the steering shaft 11 is rotatably supported and with a flange 25 around which the elastic supporting member 21 is attached. The magnetic head holder 23 is made of a synthetic resin or plastic by molding process and the elastic supporting member 21 is made of an elastic material such as rubber also by molding process. The flange 25 of the magnetic head holder 23 is molded together in molding the elastic supporting member 21. The end surface of the magnetic head 20 facing the outer peripheral surface of the steering shaft 11 is formed in circular arc shape in such a way that a predetermined clearance c (e.g. several to several tens of micron) is maintained between the magnetic head 20 and the steering shaft 11.

In the magnetostriction torque sensor thus constructed as described above, since the clearance c between the magnetic head 20 and the steering shaft 11 is precisely maintained at a constant value simply by the bearing portion 24 of the magnetic head holder 23 and since the magnetic head 20 is movably supported by the steering column 13 via the elastic supporting member 21, it is possible to stably detect change in magnetic force distributed on the outer surface of the steering shaft 11, that is, a torque appled to the steering shaft 11, provided that the roundnesses and straightnesses of the steering shaft 11 and the bearing portion of the magnetic head holder 23 are accurate within a short distance. In other words, the magnetic head supporting structure according to the present invention is never subject to the influence of (1) the roundness and the straightness of the steering column 13; (2) the concentricity of the steering shaft and the steering column; (3) the precision of the bearings attached to the steering column 13; (4) the use of soft magnetostrictive material, etc. Additionally, since no special precious work is required in manufacturing and assembling the torque sensor, it is possible to reduce the manufacturing cost and to improve the productivity markedly.

Figure 8:
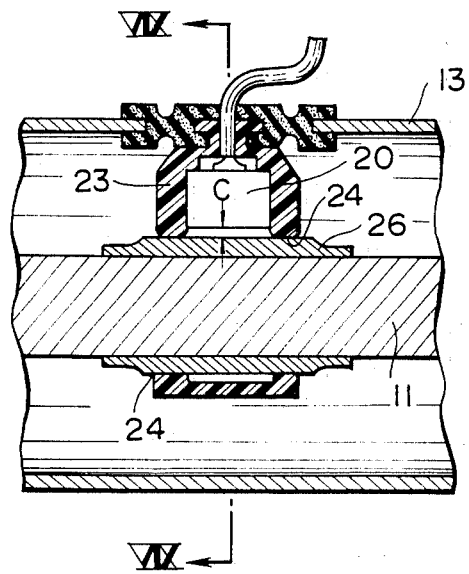
FIG. 8 is an enlarged fragmentary cross-sectional view showing a second embodiment of the magnetic head supporting structure of the magnetostriction torque sensor according to the present invention, taken along the axial direction of the steering shaft, in which the steering shaft is rotatably supported by a magnetic head holder in such a way that a predetermined clearance is maintained between the magnetic head end and the outer surface of an inner tubular member made of a magnetostrictive material fixedly fitted to the steering shaft.
Figure 9:
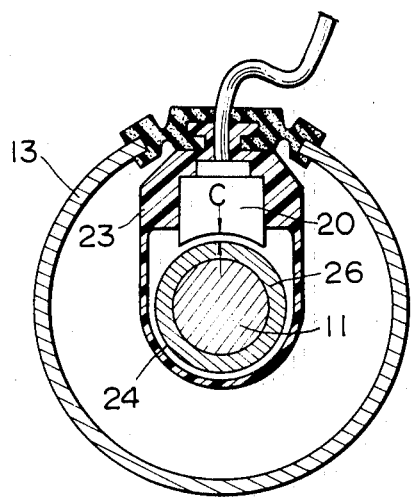
FIG. 9 is a fragmentary cross-sectional view similar to FIG. 8, taken along the line VIX—VIX shown in FIG. 8 or along the radial direction of the steering shaft.

FIGS. 8 and 9 show a second embodiment of the magnetostriction torque sensor according to the present invention. In this embodiment, an inner tubular member 26 made of a magnetostrictive material is further provided for the torque sensor. This inner tubular member 26 is fixedly fitted to the outer peripheral surface of the steering shaft 11 and rotatably supported by the bearing portion 24 of the magnetic head holder 23. In this embodiment, since the torque or torsional stress of the steering shaft 11 can detected via the magnetostriction inner tubular member 26, it is possible to freely select the material of the steering shaft 11 under consideration of strength and workability, without limiting the material of the steering shaft 11 to a magnetostrictive material which is high in permeability but therefore high in cost.

In this second embodiment, similarly to the first embodiment, since no extreme precision is required in manufacturing and assembling with respect to the roundness and the straighness of the steering column 13, the concentricity of the steering shaft 11, inner tubular member 26 and the steering column 13, the precision of the bearings of the steering column 13, etc., it is possible to reduce the manufacturing cost and to improve the productivity.

Figure 10:
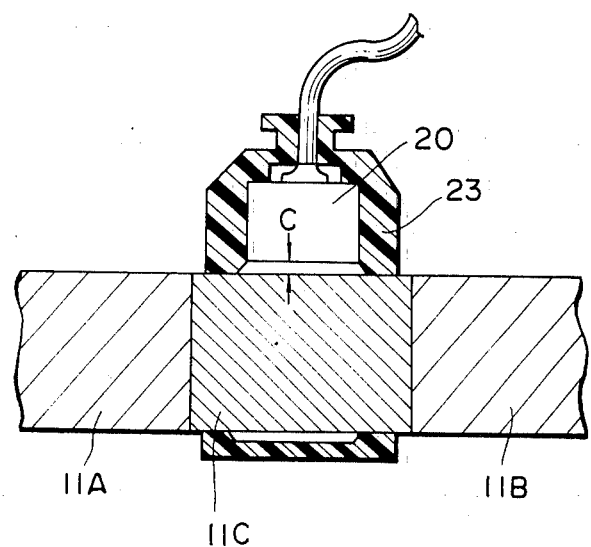
FIG. 10 is an enlarged fragmentary cross-sectional view showing a third embodiment of the magnetostriction torque sensor according to the present invention, taken along the axial direction of the steering shaft, in which only a part of the steering shaft is made of a magnetostrictive or magnetic material and sandwiched by two other parts made of a non-magnetostrictive or non-magnetic material, being rotatably supported by the magnetic head holder in such a way that a predetermined clearance is maintained between the magnetic head end and the part of steering shaft made of a magnetostrictive or magnetic material.

FIG. 10 shows a third embodiment of the magnetostriction torque sensor according to the present invention. In this embodiment, only a part 11c of the steering shaft 11, the outer surface of which is brought near to the magnetic head 20, is made of a magnetostrictive material. The steering shaft 11 is formed by sandwiching the cylindrical shaft 11c made of a magnetostrictive material by two other cylindrical shafts 11A and 11B made of a non-magnetostrictive material. Since magnetostrictive material is relatively high in cost, it is possible to reduce the material cost of the steering shaft 11.

The above embodiments have been described of the magnetostriction torque sensor provided with the magnetic head 20 including exciting coils and sensing coils. However, without being limited to the sensing coils, it is possible to use a Hall effect element.

Figure 11:
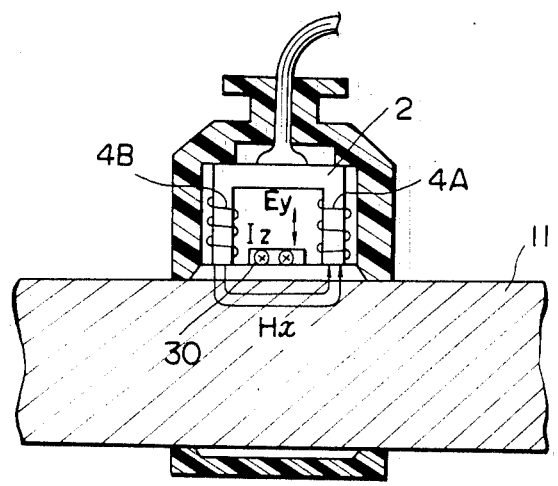
FIG. 11 is a fragmentary cross-sectional view showing an exciting core including two exciting coils and a Hall effect element used for the magnetostriction torque sensor according to the present invention, taken along the axial direction of a steering shaft, in which the exciting core and the Hall effect element are fixed to the magnetic head holder in such a way that a predetermined clearance is maintained between the core end of the Hall effect element end and the outer surface of the steering shaft.

FIG. 11 shows a fourth embodiment of the magnetostriction torque sensor according to the present invention. In this drawing, a Hall effect element 30 is arranged in place of the sensing coils 5A and 5B shown in FIGS. 1 and 2.

In Hall effect, when current $I_z$ is passed along the longitudinal direction of a long and slender conductive or semiconductive Hall effect element 30 and a magnetic field $H_x$ is applied to the perpendicular to the longitudinal direction of the Hall effect element 30, an electromotive force $E_y$ is generated across the Hall effect element 30 in the direction perpendicular to the current $I_z$ and the magnetic field $H_x$.

Therefore, when the magnetic field $H_z$ changes due to a torque applied to the steering shaft 11, it is possible to detect the torque as change in voltage developed across the Hall effect element 30.

Further, the above embodiments have been explained of the case where the magnetostriction torque sensor according to the present invention is appled to the steering shaft for an automotive vehicle. However, without being limited to the steering shaft, it is of course possible to apply the present invention to other industrial fields when a torque applied to an axle is required to be detected.

As described above, in the magnetostriction torque sensor according to the present invention, since a clearance between the cores including the exciting and sensing coils or a Hall effect element and the outer peripheral surface of an axle to be measured is always kept at a constant value, irrespective of problems that the axle or other elements deform or the manufacturing and assembling precision is inferior, it is possible to stably and precisely detect the torque applied to an axle to be measured, provided that the axle to be measured is securely and rotatably supported by the bearing portion of the magnetic head holder within which a magnetic head is housed.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A magnetostriction torque sensor for detecting a torsional stress applied to an axle to be measured, which comprises:
  (a) an outer tubular member for housing the axle to be measured in such a way as to rotatably support the axle by a pair of bearings attached thereto on either side thereof;
(b) magnetic head means including:
  (1) an exciting core having an exciting coil for generating a magnetic field on an outer peripheral surface of the axle to be measured; and
  (2) a sensing core having a sensing coil for sensing magnetostrictive components of the magnetic field caused by a torsional stress applied to the axle, said sensing core being arranged at a right angle to said exciting core;
(c) magnetic head holder means for covering and supporting said magnetic head means therewithin, said holder means being formed with bearing portions through which the axle to be measured is rotatably supported in such a way that a predetermined small clearance is kept between a sensing surface of said magnetic head means and the outer peripheral surface of the axle to be measured;
(d) an elastic supporting member for elastically supporting said magnetic head holder means to said outer tubular member in such a way as to allow said magnetic head holder means to be movable in the radial direction of the axle to be measured.

2. The magnetostriction torque sensor as set forth in claim 1, wherein said magnetic head holder means is formed with a flange elastically connected to said elastic supporting member.

3. The magnetostriction torque sensor as set forth in claim 1, which further comprises an inner tubular member made of a magnetostrictive material fixedly fitted to an outer peripheral surface of the axle to be measured, said inner tubular member being rotatably supported by the bearing portions of said magnetic head holder means, whereby it is possible to detect a torsional stress applied to the axle to be measured which is made of a non-magnetostrictive material.

4. The magnetostriction torque sensor as set forth in claim 1, wherein a part of the axle to be measured is made of a magnetostrictive material, said part being supported by the bearing portions of said magnetic head holder means and sandwiched by two other axle portions made of a non-magnetostrictive material, whereby it is possible to make the major part of the axle to be measured with a non-magnetostrictive material.

5. The magnetostriction torque sensor as set forth in claim 1, wherein said magnetic head holder means is made of a synthetic resin.

6. A magnetostriction torque sensor for detecting a torsional stress applied to an axle to be measured, which comprises:
(a) an outer tubular member for housing the axle to be measured in such a way as to rotatably support the axle by a pair of bearings attached thereto on either side thereof;
(b) magnetic head means including:
  (1) an exciting core having an exciting coil for generating a magnetic field on an outer peripheral surface of the axle to be measured; and
  (2) a Hall effect element for sensing magnetostrictive components of the magnetic field caused by a torsional stress applied to the axle;
(c) magnetic head holder means for covering and supporting said magnetic head means therewithin, said holder means being formed with bearing portions through which the axle to be measured is rotatably supported in such a way that a predetermined small clearance is kept between a sensing surface of said magnetic head means and the outer peripheral surface of the axle to be measured;
(d) an elastic supporting member for elastically supporting said magnetic head holder means to said outer tubular member in such a way as to allow said magnetic head holder means to be movable in the radial direction of the axle to be measured.

7. The magnetostriction torque sensor as set forth in claim 6, wherein said magnetic head holder means is formed with a flange elastically connected to said elastic supporting member.

8. The magnetostriction torque sensor as set forth in claim 6, which further comprises an inner tubular member made of a magnetostrictive material fixedly fitted to an outer peripheral surface of the axle to be measured, said inner tubular member being rotatably supported by the bearing portions of said magnetic head holder means, whereby it is possible to detect a torsional stress applied to the axle to be measured which is made of a non-magnetostrictive material.

9. The magnetostriction torque sensor as set forth in claim 6, wherein a part of the axle to be measured is made of a magnetostrictive material, said part being supported by the bearing portions of said magnetic head holder means and sandwiched by two other axle portions made of a non-magnetostrictive material, whereby it is possible to make the major part of the axle to be measured with a non-magnetostrictive material.

10. The magnetostriction torque sensor as set forth in claim 6, wherein said magnetic head holder means is made of synthetic resin.

* * * * *